United States Patent

[11] 3,597,984

| [72] | Inventor | Henry P. Lichte, Jr.<br>Houston, Tex. |
|---|---|---|
| [21] | Appl. No. | 725,664 |
| [22] | Filed | May 1, 1968 |
| [45] | Patented | Aug. 10, 1971 |
| [73] | Assignee | Sperry Sun Well Surveying Company<br>Sugar Land, Tex. |

[54] GYROSCOPE CONTROL DEVICE
4 Claims, 2 Drawing Figs.

[52] U.S. Cl. ........................................................ 74/5.43
[51] Int. Cl. ........................................................ G01c 19/50
[50] Field of Search ................................................ 74/5.43, 5.7

[56] References Cited
UNITED STATES PATENTS

| 2,093,417 | 9/1937 | Carter | 74/5.43 X |
| 2,174,777 | 10/1939 | Carter et al. | 74/5.43 |
| 2,248,141 | 7/1941 | Von Manteuffel | 74/5.43 |
| 2,492,057 | 12/1949 | Noxon | 74/5.43 |
| 2,997,886 | 8/1961 | Jones | 74/5.43 X |
| 3,319,475 | 5/1967 | Ballard | 74/5.43 |

FOREIGN PATENTS

| 525,697 | 9/1940 | Great Britain | 74/5.43 |

*Primary Examiner*—Manuel A. Antonakas
*Attorneys*—George L. Church, Donald R. Johnson, Wilmer E. McCorquodale, Jr. and John E. Holder ABSTRACT: Utilizing air current generated by the rotating spinner of a gyro for stabilizing the position of the rotor relative to the outer gimbal of the gyro. An opening is formed in the rotor cover, which permits the escape of air from the rotor housing, and directs such air against a baffle element which is mounted on the rotor housing. Such air currents impinging upon the baffle generate a torque in a plane perpendicular to the spin axis of the rotor, thus generating a precessing torque for urging the rotor housing towards a position perpendicular to the outer gimbal.

Patented Aug. 10, 1971 3,597,984

INVENTOR
HENRY P. LICHTE JR.

John E. Holder

ATTORNEY 3,597,984

GYROSCOPE CONTROL DEVICE

BACKGROUND OF THE INVENTION

This invention relates to gyroscopic directional devices, and more particularly pertains to a stabilizing device for such an instrument.

Borehole surveying instruments incorporating gyroscopic directional devices have been known for many years, but to a great extent these instruments have been of a large size. In order to construct gyros which may be housed in small diameter housings, certain design features and construction criteria have developed which, in themselves, have created problems not associated with larger gyros. For example, in a large gyroscopic instrument, the rotor is sufficiently large that air currents generated by the spinning rotor itself do not substantially effect the rotor or create torqueing moments within the gyroscopic system. However, when small gyroscopic instruments are built, the rotors are, of necessity, much smaller, and are operated at high speeds, thus producing substantial air movements about the rotor while at the same time being of a small enough mass to be affected by torqueing moments created by the air currents impinging upon portions of the instrument. As a result, covers have been provided over the rotor housings which are located close to the housing to provide a minimum of space between the rotor and the housing, and thus a minimum of air to be stirred, so to speak, by the spinning rotor.

In addition, the enclosure about the rotor is sometimes filled with a light gas and sealed. The light gas provides a minimum resistance to rotor spin. Normally, gyros used for downhole directional references are photographed. The instrument housing is opened to obtain the photographed information. Thus gas or fluid-enclosed systems are not suited for the field conditions associated with well surveying because of difficulty in field service of the instrument.

In order to compensate for precessing of the rotor housing about its axis, various devices have been provided to compensate for movement of the rotor housing out of a prescribed plane by applying a restoring force in a perpendicular axis to precess the rotor housing back to a desired position. One form of such a device is the use of a reversing motor which may be arranged to apply torqueing forces about a desired axis of the gyro to apply a precessing force to the rotor housing. The construction of such a system, including the electrical error sensing and control, is expensive, and also has some undesirable design features. In addition, space requirements may prohibit the addition of such features to a gyro.

It is therefore an object of the present invention to provide a new and improved gyroscope control mechanism.

SUMMARY OF THE INVENTION

With this and other objects in view, the present invention contemplates a gyroscope control for maintaining the gyroscope rotor in a predetermined position relative to the outer gimbal. Openings are provided in the rotor housing cover to permit the intake of air into the rotor housing, and an opening is provided to permit the escape of air currents which are generated by the spinning rotor from the housing. A baffle member is provided on the rotor housing which is adjacent the output opening so that escaping air currents impinge upon the baffle and thereby generate torqueing moments which are applied to the rotor housing in a plane perpendicular to the spin axis of the rotor. Such torqueing moments, when directed in this fashion, generate a precessing torque which tends to restore the rotor housing to its normal position perpendicular to the outer gimbal.

A complete understanding of this invention may be had by reference to the following detailed description, when read in conjunction with the accompanying drawings illustrating an embodiment thereof.

DESCRIPTION OF THE PREFERRED EMBODIMENT

Figure 1:
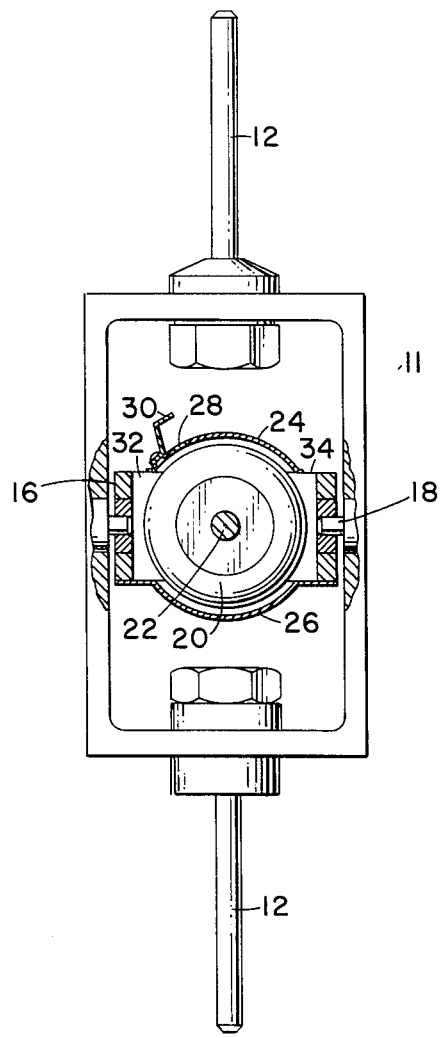
FIG. 1 is a side elevation view, partially in cross section, of a gyroscopic assembly.

Referring first to FIG. 1 of the drawing, the gyroassembly includes an outer gimbal 11 formed by a rectangular frame member, and having vertical shafts 12 extending outwardly from the upper and lower ends thereof to form a vertical axis for the gyroassembly. Direction indicating, or readout means (not shown) may be attached to the vertical shafts. The shafts 12 are attached to the outer gimbal 11 by means of threaded attaching members or the like, which maintain the shafts and outer gimbal in a fixed relationship. Mounted inside the outer gimbal is an inner gimbal or rotor housing 16. The rotor housing is mounted for rotation about a second shaft or axis 18 perpendicular to the outwardly extending shafts 12 of the outer gimbal. Inside the rotor housing is a gyrowheel or rotor assembly 20 mounted for rotation about a third shaft or axis 22 which is perpendicular to the second axis 18, and also to the vertical axis 12.

The gyrowheel or rotor 20 is driven by means of an electrical motor forming a part of the rotor assembly. For the sake of clarity, the motor is not shown in the drawings. Upper and lower covers 24, 26, are positioned over the top and bottom open ends respectively of the rotor housing. The covers are used to isolate the circulation of air, caused by spinning of the rotor, to the interior of the covered rotor housing. This isolation of air circulation prevents the projection of air currents from the spinning rotor against other portions of the gyro and gyrohousing.

Figure 2:
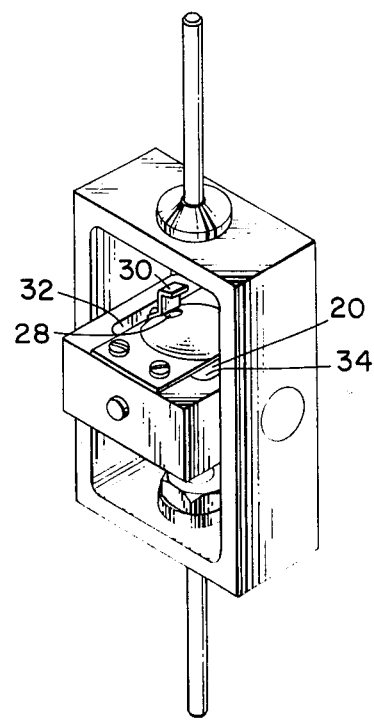
FIG. 2 is a perspective view of the assembly showing the top side of the rotor housing.

Referring next to FIG. 2, a small circular opening 28 is provided in the top cover 24 to permit the escape of air currents in a predetermined path, from the rotor housing. The openings 28, because of its position in the cover, directs such air flow against a baffle or deflecting member 30 attached to the cover 24. Enlarged openings 32, 34, are provided in the cover 24 to permit the entry of makeup air into the interior of the covered rotor housing. The makeup air is spun or moved by the spinning rotor and ejected through the opening 28 against the baffle 30.

In the operation of directional gyroscopic devices, precessing forces are inherently present in the construction of the devices, and tend to cause random drift of the gyro about its vertical axis. Since, as in a well tool, an indicator is usually attached to the vertical axis, such random drift will cause error in the gyroscopic instrument interpretation. Such precessing forces are caused by friction in bearing surface pivots, etc. as well as by outside forces such as air currents impinging upon portions of the assembly. The rate at which a gyro precesses is inversely proportional to the speed of the rotor and proportional to the deflective force. Of course, the heavier the spinning rotor, and the faster it is rotated, the less effect a deflective force will have on the rotor, and therefore the less will be the precession of the instrument.

In small gyros this presents another problem which is aggravated by the relatively small size of the rotor. The rapid speed of rotation of such a small rotor generates a comparatively great amount of air movement which in turn causes precessing moments to be applied to parts of the gyrosystem.

From whatever source, if precession is not dampened, the rotor housing will tilt to such degree that the housing will reach limit points which stop its free movement. At this point the outer gimbal will spin abandonedly. This condition is known as spin out and renders the instrument useless. Some method is therefore required to dampen the oscillations, or precessing movements of the gyro, so that the gyro spin axis comes to rest in a position 90° to the outer gimbal, or at least tends to attain such a position. Both horizontal and vertical dampening forces may be used to control gyro stability, with each technique have certain advantages and disadvantages. Vertical dampening involves supplying a corrective torque about the vertical axis, proportional to the gyrotilt and in such a direction that the resulting precession tends to reduce the tilt. This may be done by using electrical torqueing motors on the vertical axis or shaft, which are driven in response to a tilt indicating means on the rotor housing. One such form of indicator may be a pendulum unit which produces small voltages proportional to the gyrotilt. Such voltages are transmitted by means of slip rings and brushes to an electrical torque motor located on the azimuth and/or tilt axis of the gyro.

Because of the cost requirements of such compensating devices, it is not economically feasible to use such techniques in some instances. In addition, because of the small size of instruments needed for certain uses in well bores, it is not convenient to use torqueing motors and the like for maintaining control of rotor precession. The present invention utilizes a restoring system which is inexpensive and does not require such an electrical control system. The spinning rotor 20 generates air currents within the enclosed housing of the rotor, which air currents are permitted to escape tangentially from the spinning rotor through the small circular opening 28 in the housing cover 24. The opening is arranged in the cover to direct such escaping air against the deflecting member or baffle 30. This in turn imparts a force to the cover 24 and rotor housing 16, which is in the plane of the rotor housing axis 18 and perpendicular to the spin axis 22 of the rotor. When the rotor housing is in a position 90° to the vertical axis of the gyro, as shown in FIG. 1, such force imparted to the housing 16 is in a plane described by the outer gimbal frame 11, the axis 18 of the rotor housing, and the vertical axis 12 of the gyro. Therefore, when the rotor housing is not precessed, no moment is generated about the vertical axis, since the restoring force is in the plane of the vertical axis, and therefore no restoring torque is generated.

If, however, due to precessing forces acting on the device, the rotor housing is tilted from its normal position 90° to the outer gimbal, the force generated on the rotor housing by the escaping air against the deflecting means, will be in a plane not aligned with the vertical axis of the instrument, which in turn will generate a torqueing moment about the vertical axis. This torqueing moment will generate a precessing force about the vertical axis which will precess the rotor housing in an opposite direction, thereby tending to restore the rotor housing to its position 90° to the outer gimbal. Although the restoring forces of the air currents impinging upon the rotor housing may not be sufficient to maintain the rotor housing in an unprecessed condition, such forces will be sufficient to prevent a degree of precession which will cause the gyro to spin out.

While a particular embodiment of the present invention has been shown and described, it is apparent that changes and modifications may be made without departing from this invention in its broader aspects.

I claim:

1. In a gyroscope having a gimbal, rotor, rotor housing, and cover means on the rotor housing, means for exerting a corrective force to maintain the rotor and rotor housing in a fixed position relative to the gimbal, which means comprises: baffle means extending outwardly from said rotor housing arranged such that no corrective force is exerted by the baffle means when the rotor is rotating in the plane of the gimbal, and an opening in the cover means for directing an air flow against said baffle means to exert a corrective force.

2. The apparatus of claim 1 wherein said air flow is generated by the spinning of said rotor.

3. In a directional gyroscope for use in a well bore apparatus, the combination of means for maintaining a rotor, rotor housing, and gimbal of the gyroscope in a predetermined relationship, which means comprises: a cover on the rotor housing and surrounding the rotor to limit the amount of air subjected to the rotative movement of said rotor, air intake means on said cover for permitting air to become subjected to the rotative movement of said rotor, said cover having an opening for permitting the escape of air moving as a result of its contact with the moving rotor; and baffle means located on the rotor housing for impeding the flow of air from said opening and for generating a torqueing force on said rotor housing, said torqueing force being in a plane perpendicular to the spin axis of said rotor.

4. In a gyroscope having a gimbal, rotor, and rotor housing, means for maintaining the rotor and rotor housing in a fixed position relative to the gimbal, which means comprises: baffle means on said rotor housing; cover means surrounding said rotor for preventing air currents from the rotor being directed against said gimbal; means for directing an air flow against said baffle means, comprising an opening in said cover means adjacent said baffle means; and air intake means in said cover means.